United States Patent
Mishra et al.

(10) Patent No.: US 10,680,842 B2
(45) Date of Patent: Jun. 9, 2020

(54) PARALLEL EXECUTION OF SERVICES OF A SERIAL SERVICE CHAIN ON PACKETS USING MULTICAST-BASED SERVICE INSERTION

(71) Applicant: VMware, Inc., Palo Alto, CA (US)

(72) Inventors: Rahul Mishra, Mountain View, CA (US); Chidambareswaran Raman, Sunnyvale, CA (US); Abhishek Mishra, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/177,830

(22) Filed: Nov. 1, 2018

(65) Prior Publication Data
US 2020/0145243 A1    May 7, 2020

(51) Int. Cl.
*H04W 4/00* (2018.01)
*H04L 12/18* (2006.01)
*G06F 9/455* (2018.01)

(52) U.S. Cl.
CPC ...... *H04L 12/1854* (2013.01); *G06F 9/45558* (2013.01); *H04L 12/1881* (2013.01); *G06F 2009/45595* (2013.01)

(58) Field of Classification Search
CPC ............. H04L 12/1854; H04L 12/1881; G06F 9/45558; G06F 2009/45595

(Continued)

(56) References Cited

U.S. PATENT DOCUMENTS

2005/0102297 A1    5/2005 Lloyd et al.
2013/0170490 A1*   7/2013 Kreeger .................. H04L 41/12
                                                            370/390

(Continued)

OTHER PUBLICATIONS

VMware Virtual SAN Layer 2 and Layer 3 Network Topologies. (From Applicant's IDS) (Year: 2017).*

(Continued)

*Primary Examiner* — Mang Hang Yeung

(57) ABSTRACT

A method for a parallel execution of services of a serial service chain on packets using multicast-based service insertion is disclosed. In an embodiment, the method comprises identifying a plurality of services to be applied to packets of a data flow and determining a plurality of service machines that are configured to provide the plurality of services for the data flow. The plurality of service machines is grouped to a plurality of multicast groups; wherein multicast groups in the plurality of multicast groups are sequentially ordered from a first multicast group that includes a largest count of service machines to a last multicast group that includes a smallest count of service machines. Upon detecting a packet of the data flow, the is stored in memory, and multicast to the first multicast group of the plurality of multicast groups to cause applying, in parallel, services of service machines included in the first multicast group to the packet. Once a plurality of responses is received from service machines that belong to the first multicast group, the plurality of responses is used to determine whether service processing of the packet is completed. In response to determining that service processing of the packet is completed, the packet is disposed according the plurality of responses and without multicasting the packet to any other multicast group of the plurality of multicast groups.

20 Claims, 9 Drawing Sheets

(58) Field of Classification Search
USPC .......................................................... 370/392
See application file for complete search history.

(56) References Cited

U.S. PATENT DOCUMENTS

| 2013/0322441 | A1* | 12/2013 | Anumala | ............ | H04L 12/1886 |
| | | | | | 370/390 |
| 2014/0192804 | A1 | 7/2014 | Ghanwani | | |
| 2015/0124808 | A1* | 5/2015 | Tatsumi | .................. | H04L 49/25 |
| | | | | | 370/390 |
| 2016/0182684 | A1 | 6/2016 | Connor et al. | | |

OTHER PUBLICATIONS

Chapter 31, "Configuring IPv4 Multicast Layer 3 Switching", Cisco 7600 Series Router Cisco IOS Software Configuration Guide, Release 15 S, dated 2017, 26 pages.
Ooms et al., "Overview of IP Multicast in a Multi-Protocol Label Switching (MPLS) Environment", Networking Group, dated Aug. 2002, 30 pages.
Morin T., Ed., "Requirements for Multicast in Layer 3 Provider-Provisioned Virtual Private Networks" (PPVPNs, dated Apr. 2007, 37 pages.
Technical White Paper, "VMware Virtual SAN Layer 2 and Layer 3 Network Topologies", Developments, dated 2017, 24 pages.
The International Searching Authority, "Search Report" in application No. PCT/US2019/058679, dated Jan. 15, 2020, 12 pages.

* cited by examiner

370 Example of an Drop Response

372 Example of a Allow Response

374 Example of a Modify Response

376

PARALLEL EXECUTION OF SERVICES OF A SERIAL SERVICE CHAIN ON PACKETS USING MULTICAST-BASED SERVICE INSERTION

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Furthermore, it should not be assumed that any of the approaches described in this section are well-understood, routine, or conventional merely by virtue of their inclusion in this section.

Service chaining in virtualization networks usually means executing a sequence of service functions on a packet before the packet is either forwarded or discarded. The service functions, also referred to as services, may include firewall services, intrusion detection services, intrusion prevention services, load balancing services, and others. Performing a sequence of services on a packet may include determining whether the packet is to be allowed, dropped, or modified. If, after performing on the packet all services in the sequence, the packet is allowed or modified, then the packet is forwarded; otherwise, the packet is dropped.

Executing a sequence of services on a packet usually includes applying the services to the packet in a sequential order—one service from the sequence at the time. In most cases, however, the sequential processing of the packet is time-consuming, and bandwidth-demanding.

It has been shown that in a typical service chaining, packets are either allowed or dropped, but rarely modified. It has been also shown that since the services are applied to a packet sequentially, in some situations the packet processing is inefficient. One of such situations occurs when a packet requires applying several services, and all the services, but the last one, allow the packet while the last service requests dropping the packet. In this situation, applying all the services according to the sequence to eventually drop the packet anyway is inefficient.

Therefore, there is a need for an improved method for servicing packets in virtualization networks that would optimize and speed the packet servicing as well as reduce the servicing bandwidth requirements.

SUMMARY

In an embodiment, the techniques are described for parallel execution of a set of services, of a service chain, on packets using multicast-based service insertion. The multicast-based insertion of services includes grouping the service machines that provide the services of the service chain into multicast groups, and selectively multicasting a packet to one or more groups based on outcome of the service processing performed by preceding multicast group or groups. In some embodiments, instead of multicasting the packet to a multicast group, the packet is unicast to each service machine included in the group for concurrent processing of the packet by the group of service machines.

The techniques may be implemented in a service insertion component of a hypervisor, or any other component configured to manage the packet processing. The service insertion component may be implemented as a software module of the hypervisor.

The techniques provide improvements in servicing packets by speeding up the packet servicing and reducing bandwidth requirements of the service processing—especially when the packet servicing includes performing a long chain of services on the packet.

An approach for parallel execution of a sequence of services, of a service chain, on a packet may include grouping, using a service insertion module implemented in a hypervisor or the hypervisor, the service machines that provide the services to the packet into multicast groups. The approach also includes storing the packet in memory of the service insertion module, and multicasting the packet to the largest multicast group. Upon receiving the packet, all machines included in the multicast group apply their own service functions to the packet in parallel. That means that each machine in the group applies its own service function to the packet, generates a response indicating whether the packet is to be dropped, allowed, or modified, and provides a response to the service insertion module. Based on the responses received from the service machines, the service insertion module determines whether to drop, allow, or modify the packet, and/or whether to multicast the packet or the modified packet to another multicast group.

The service insertion module repeats the process of multicasting and analyzing the responses until the service insertion module disposes the packet and there is no need to multicast the packet anymore. As it will be described later, this process produces the same results as a typical sequential processing of a chain of services; however, it is more efficient and faster than the sequential servicing of the packets using other approaches.

DETAILED DESCRIPTION

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach.

1. Example Physical Implementations

Figure 1:
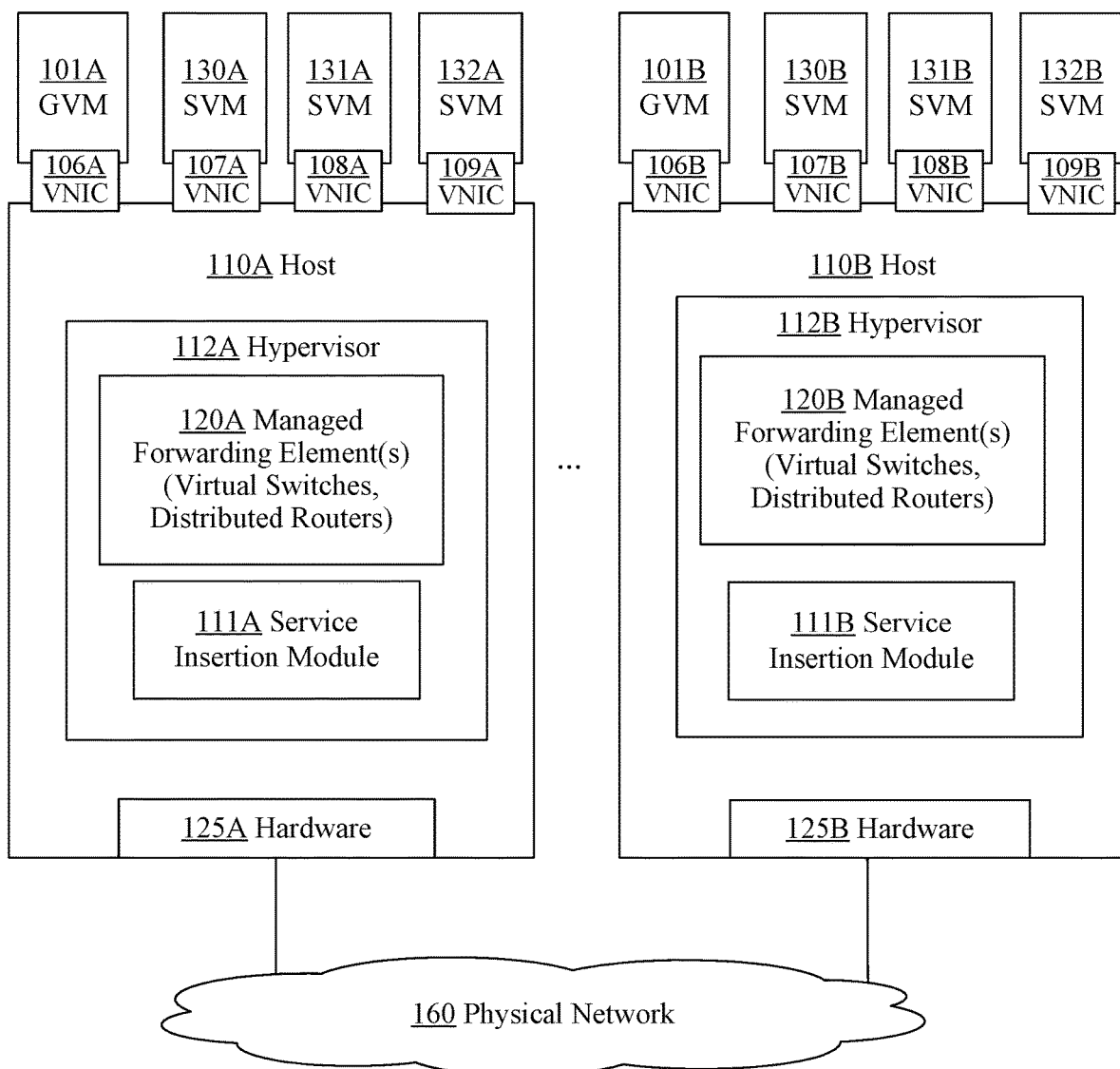
FIG. 1 is a block diagram depicting an example physical implementation view of an example logical network environment for implementing an approach for parallel execution of services, of a serial service chain, on packets using multicast-based service insertion.

FIG. 1 is a block diagram depicting an example physical implementation view of an example logical network environment for implementing an approach for parallel execution of services, of a serial service chain, on packets using multicast-based service insertion. In the depicted example, environment 10 includes one or more hosts 110A and 110B, and one or more physical networks 160. Environment 10 may include additional hosts and additional networks not depicted in FIG. 1.

Hosts 110A-110B may be configured to implement virtual machines ("VMs"), edge service gateways, logical routers, logical switches, and the like. Hosts 110A-110B are also referred to as computing devices, host computers, host devices, physical servers, server systems, or physical machines.

In the example depicted in FIG. 1, host 110A is configured to support a guest virtual machine GVM 101A, and service virtual machines SVM 130A, 131A, 132A; while host 110B is configured to support a guest virtual machine GVM 101B, and service virtual machines SVM 130B, 131B, 132B. The hosts may support additional guest machines, additional service machines, as and may be in communication with physical appliances and gateways via physical network 160.

Guest virtual machines GVM 101A-101B are examples of virtualized computing instances or workloads. A virtualized computing instance may represent an addressable data compute node or an isolated user space instance.

Service virtual machines 130A-132A and 130B-132B are virtual machines configured to provide services to packets of data flows. Examples of services include firewall services, IDS, IPS and other services that may be performed on packets, such as NAT services, DHCP services, site-to-site VPN services, L2 VPN services, load balancing services, and the like.

In an embodiment, hosts 110A-110B are configured to support execution of hypervisors 112A-112B which include managed forwarding elements 120A-120B, respectively. Hypervisors 112A-112B are software layers or components that support the execution of machines 101A, 130A-132A, 101B, and 130B-132B. Hypervisors 112A-112B may be configured to implement virtual switches and forwarding tables that facilitate data traffic between the virtual machines. In certain embodiments, virtual switches and other hypervisor components may reside in a privileged virtual machine, sometimes referred to as a "Domain Zero" or a "root partition" (not shown). Hypervisors 112A-112B may also maintain mappings between underlying hardware 125A-125B and virtual resources allocated to the respective VMs.

Managed forwarding elements 120A-120B may be configured to perform forwarding of packets communicated to and from machines 101A, 130A-132A, 101B, and 130B-132B. Managed forwarding elements 120A and 120B may collectively implement one or more logical switches and logical routers, which may be distributed across multiple hosts. Although only one managed forwarding element is shown in each hypervisor, it should be noted that any number of managed forwarding elements may be so instantiated.

Host 110A-110B include one or more hardware components 125A-125B, respectively. Hardware components 125A-125B may include one or more processors, one or more memory units, one or more physical network interface cards, and one or more storage devices.

2. Forming Multicast Groups

Figure 2A:
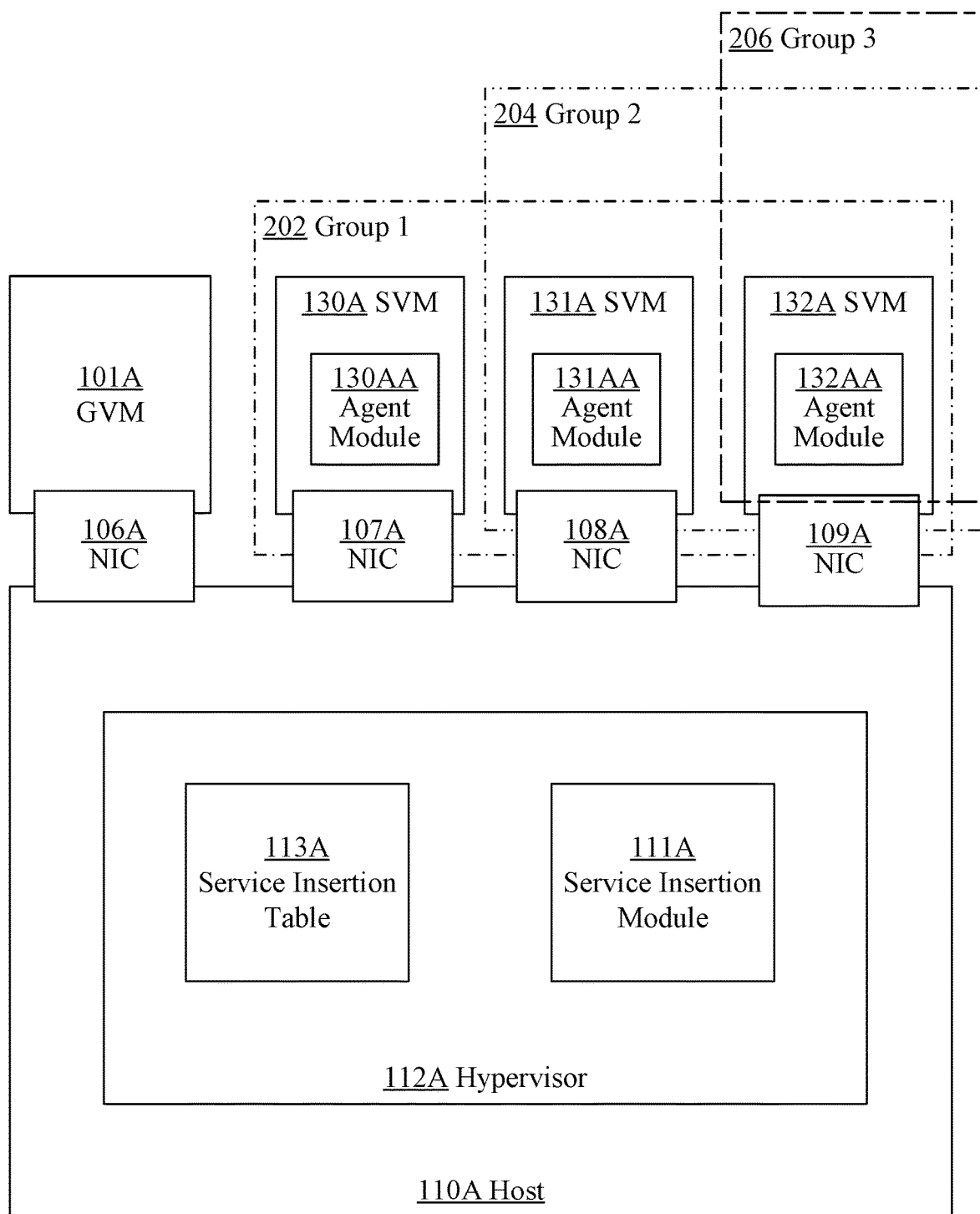
FIG. 2A is a block diagram depicting an example of multicast groups formation.

FIG. 2A is a block diagram depicting an example of multicast groups formation. In the depicted example, host 110A hosts hypervisor 112A, which implements at least a service insertion module 111A and a service insertion table 113A.

Service insertion module 111A may be configured to create multicast groups for each data flow that hypervisor 112A will be configured to process, and, upon receiving a packet, multicast the packet to the respective multicast groups.

Service insertion table 113A may be implemented in a storage unit or a memory unit, and configured to store information about multicast groups, responses received from services, and the like.

In an embodiment, service insertion module 111A, identifies a plurality of services participating in a service chain that is to be applied to packets of a data flow. Examples of the services include firewall services ("FS"), intrusion detection services ("IDS"), intrusion prevention services ("IPS"), and any other services that may be required for servicing the packets of the data flow.

Once the plurality of services for the data flow is identified, service insertion module 111A determines a plurality of service machines that are configured to provide the plurality of services for the data flow. The identified service machines may include service virtual machines and/or service physical appliances. Information about the service machines that are configured to provide the plurality of services for the data flow may be saved in service insertion table 113A.

In an embodiment, each of service machines included in the plurality of service machines includes a service application. The agent module may be implemented as a software module configured to perform services on packets of data flows. The agent module may be configured to perform, for example, any of the FW, IDS and/or IPS services.

In the example depicted in FIG. 2A, the identified service machines include SVM 130A, SVM 131A and SVM 132A. SVM 130A comprises an agent module 130AA, SVM 131A comprises an agent module 131AA, and SVM 132A comprises an agent module 132AA. In other examples, the service machines may include fewer or additional agents.

Once the plurality of service machines configured to provide the services to packets of the data flow is identified, service insertion module 111A groups the plurality of service machines into a plurality of multicast groups. The grouping may be performed using many different approaches; the approaches, however, need to group the service machines to allow each machine to service a packet of the data flow, and need to enable parallel execution of services by the multicast groups to reach the same results as if the services were applied using other approaches, i.e., sequentially, one at the time.

According to one approach, multicast groups in the plurality of multicast groups are sequentially ordered from a first multicast group that includes a largest count of service machines to a last multicast group that includes a smallest count of service machines. If the second to last SVM modifies the packet, then the modified packet is unicast to the last SVM, not multicast to a group having just one SVM in it. Information about the plurality of multicast groups may be saved in service insertion table 113A.

In the example depicted in FIG. 2A, a group 202 includes all service machines included in the plurality of service machines, i.e., SVM 130A, SVM 131A and SVM 132A. A group 204 includes two service machines SVM 131A and SVM 132A. A group 206 includes SVM 132A. As depicted in FIG. 2A, groups 202, 204 and 206 have SVM 132A in common.

Once the plurality of multicast groups is created for the data flow, service insertion module 111A may initiate a rendezvous point ("RP"), or rendezvous points, for the groups, and cause the service machines in the groups to subscribe to the corresponding multicast groups. The service insertion module is in communication with the agent, which then subscribes to the multicast groups according to the instructions from the service insertion module. The agent sets this up, then there is a separate service application that does the actual packet processing on received packets. Information about the RPs, and subscriptions may be saved in service insertion table 113A.

A rendezvous point in a multicast network domain is usually a router that acts as a shared root for a multicast shared tree. The rendezvous point is usually configured to register messages from those who requests joining a multicast group. The rendezvous point is also configured to generate and transmit prune messages and communicate multicast messages between members of the multicast group. In some embodiments, the router is a virtual distributed router such as that described in U.S. Pat. No. 8,966,035 B2. Furthermore, it should be noted that while FIG. 2A shows GVMs and all the SVMs on a single host, the SVMs may in fact reside anywhere on network 160 (shown in FIG. 1), either on the same host, on different hosts, or as physical appliances.

Figure 2B:
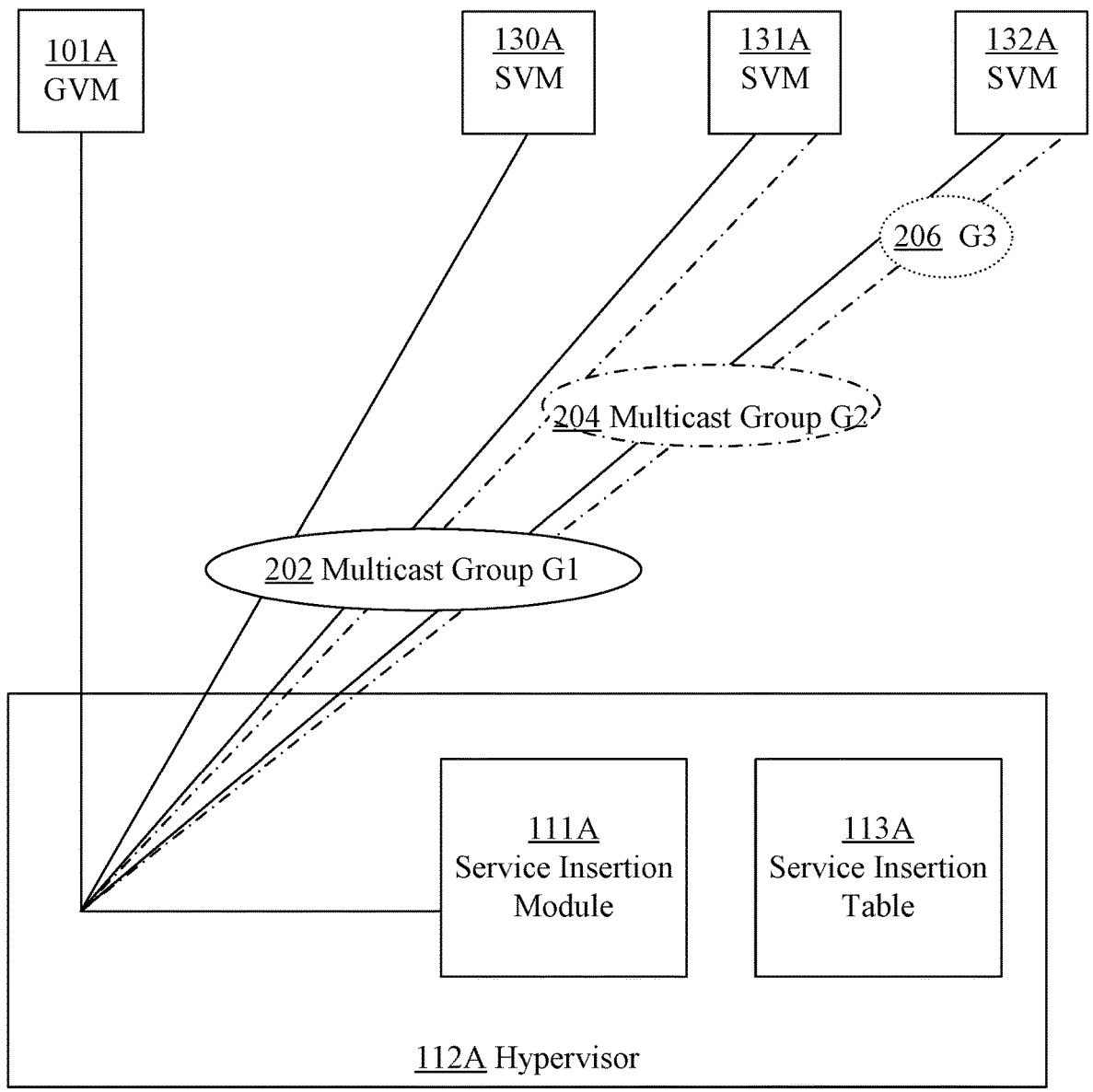
FIG. 2B is a block diagram depicting an example of multicast groups formation.

FIG. 2B is a block diagram depicting an example of multicast groups formation. In the depicted example, multicast group 202 includes SVM 130A, SVM 131A and SVM 132A; multicast group 204 includes SVM 131A and SVM 132A; and multicast group 206 includes SVM 132A.

Suppose that a packet is received that belongs to the data flow for which multicast groups 202, 204 and 206 have been created. Upon detecting the packet, service insertion module 111A may use the information, stored in service insertion table 113A, about multicast groups 202-206 to initiate parallel execution of services, of a serial service chain, on the packet using the multicast-based service insertion approach. This may include storing a copy of the packet in service insertion table 113A or other storage unit of hypervisor 112A, and multicasting the packet to all service machines of the largest multicast group, i.e., group 202.

Upon receiving the packet, all machines in multicast group 202 apply their own service functions to the packet in parallel. Hence, each machine in the group applies its own service function to the packet, generates a response indicating whether the packet is to be dropped, allowed, or modified, and provides the response to service insertion module 111A.

Based on the responses received from the services, service insertion module 111A derives a result, which leads to either dropping/forwarding the packet, or multicasting a modified packet to another multicast group which includes all and only those service machines "downstream" from the first service machine to modify the packet in the chain.

For example, after receiving responses from group 202, service insertion module 111A may determine that the packet is to be allowed, and therefore, the packet is forwarded toward its destination, and never multicast to any of groups 204-206. According to another example, service insertion module 111A may determine that the packet is to be dropped, and thus never multicast to any of groups 204-206. According to another example, service insertion module 111A may determine that SVM 130A allowed the packet, but SVM 131A modified the packet, and therefore the packet is modified to generate a modified packet, and the modified packet is forwarded (unicast) to the sole SVM in group 206, but not to group 204. The above examples illustrate some of many situations in which the presented approach provides improvements over other approaches. Since in most cases, packets are either dropped or allowed, but not modified, parallel processing by service virtual machines speeds up the servicing of the data packet and reducing the amount of resources needed to complete the servicing of the packet.

3. Example Flow Chart for Parallel Execution of Services

Figure 3A:
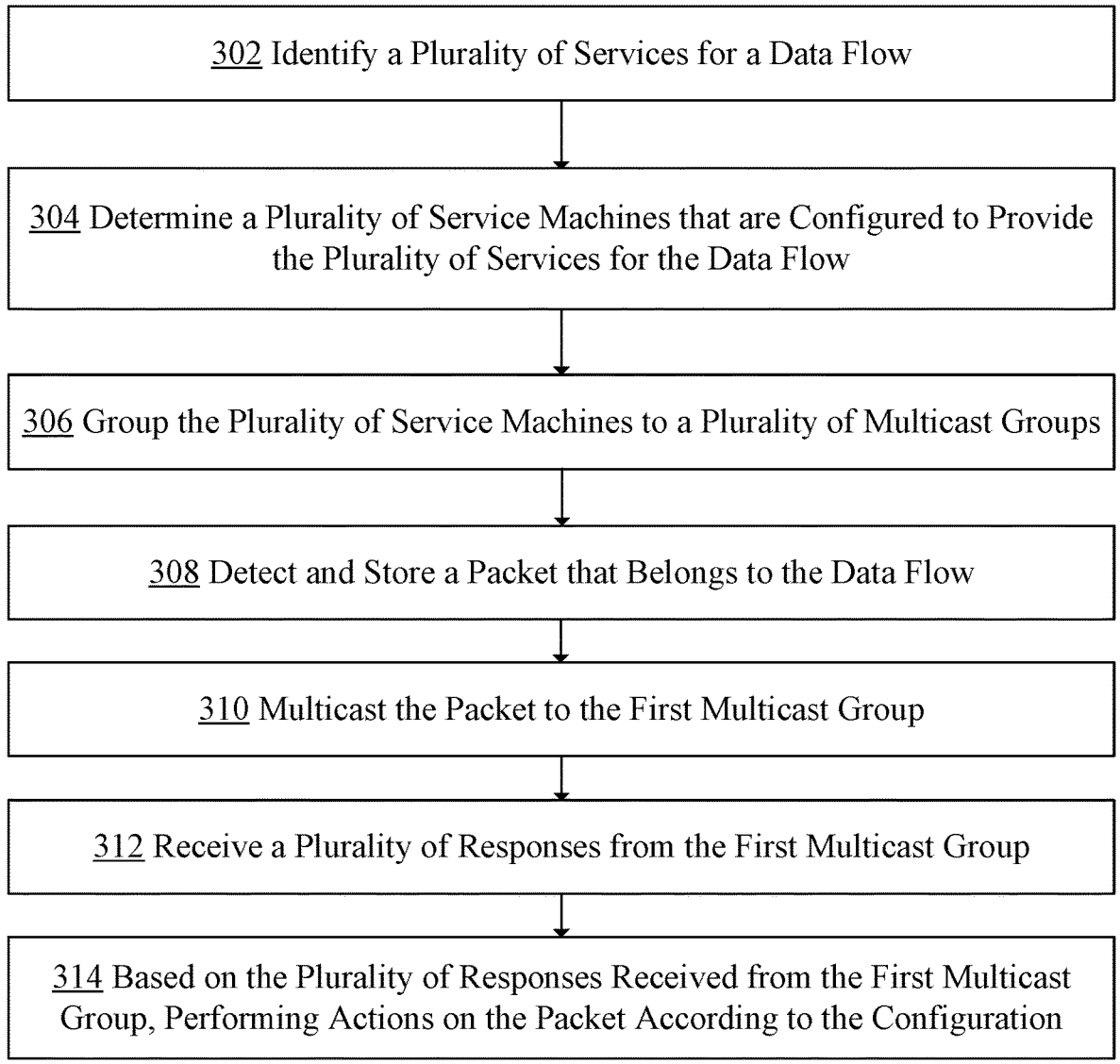
FIG. 3A is an example flow chart for implementing an approach for parallel execution of services, of a serial service chain, on packets using multicast-based service insertion.

FIG. 3A is an example flow chart for implementing an approach for parallel execution of services, of a serial service chain, on packets using multicast-based service insertion. In an embodiment, the steps described in FIG. 3A are performed by service insertion module 111A, described in FIG. 2A. However, in other embodiments, the steps may be performed by other components of hypervisor 112A, or by a dedicated agent implemented in host 110A.

3.1. Initiation

In step 302, a service insertion module identifies a plurality of services to be applied to packets of a data flow. The service insertion module may identify the services for the data flow based on information obtained from a management plane of a virtualized network, a local plane of the host on which the service insertion module is executed, an IOCHAIN implemented on the host, a virtual network interface card ("VNICs") of service machines implemented on the host, or from any other entity configured with the information about the services.

In step 304, the service insertion module determines a plurality of service machines that are configured to provide the plurality of services for the data flow. The service insertion module may obtain the information about the service machines from the management plane, the local plane, or other sources. A service machine may be a service virtual machine or a physical appliance. Examples of service machines are SVM 130A-132A and 130B-132B in FIG. 2A.

In step 306, the service insertion module groups the plurality of service machines to a plurality of multicast groups. The grouping may be performed using many different ways. In one embodiment, the grouping is performed to ensure that the multicast groups in the plurality of multicast groups are sequentially ordered from a first multicast group that includes a largest count of service machines to a last multicast group that includes a smallest count of service machines. An example of a grouping is described in FIG. 2A-2B, which depict groups 202, 204 and 206, wherein multicast group 202 is a first multicast group as it is the largest multicast group and includes all three SVMs, multicast group 204 includes two SVMs, and multicast group 206 is the smallest group as it includes one SVM.

In an embodiment, the service insertion module creates, or designates, an RP, or RPs, for the multicast groups, and causes the service machines to subscribe to the corresponding multicast groups.

In this step, the service insertion module may store the information about the services, the service machines, the multicast groups, associations between the service machines and the multicast groups, information about the RPs, and other data in service insertion table 113A.

The process described in steps 302-306 may be repeated for each data flow that hypervisor 112A will be configured to process.

3.2. Multicasting to a First Multicast Group

In step 308, the service insertion module detects a packet that belongs to the data flow. It is assumed herein that the process described in steps 302-306 has been completed for the data flow. However, if the process described in step 302-306 has not been completed for the data flow, then, upon receiving a packet of the data flow, the service insertion module may perform the steps 302-306 for the data flow, and then proceed to performing step 308.

Upon detecting the packet, the service insertion module stores the packet in memory unit of hypervisor 112A, or service insertion table 113A. If it is determined later that the packet needs to be modified, then, in some embodiments, hypervisor 112A, or the service insertion module, will modify the packet and store the modified packet in, for example, service insertion table 113A. In other embodiments, an agent of a service machine modifies the packet.

In step 310, the service insertion module identifies the first multicast group from the plurality of multicast groups that have been determined for the data flow and multicast the packet to that group. This may include accessing service insertion table 113A and retrieving information about the largest multicast group from the plurality of multicast groups for the data flow. In the example depicted in FIG. 2A, the first multicast group is group 202 as it includes all service machines that are configured to provide services to packets of the data flow.

Multicasting the packet to the first multicast group of the plurality of multicast groups causes applying, in parallel, services of the service machines included in the first multicast group to the packet. Stating differently, each of the service machines applies the service that the service machine provides for the data flow, to a copy of the same packet in parallel as other service machines in the group apply their services.

As a service machine applies a service to the packet, the service machine determines whether to drop the packet, allow the packet, or modify the packet. Then the service machine generates a response that indicates whether to drop, allow, or modify the packet, and transmits the response to the service insertion module.

A response may be encoded using a binary notation, or any other notation that may be transmitted, parsed, and interpreted by the service insertion module. For example, the response may be encoded using a binary number selected from a set [00, 01, 10], and used to represent the responses [drop, allow, modify], respectively. In an embodiment, a drop-response is encoded as "00," an allow-response is encoded as "01," and a modify-response is encoded as "10." Other notations and mappings may be also used to represent the responses.

In step 312, the service insertion module receives responses from the service machines of the first multicast group.

Responses received from service machines of a multicast group may indicate outcomes of applying the services to the packet by the service machines. The responses may be encoded according to the notation set forth by a communications protocol that is implemented in the service machines and the service insertion module. The protocol may specify the manner for encoding the responses and the manner for communicating the responses from the machines to the service insertion module.

In an embodiment, responses received from service machines include drop-responses, allow-responses, and/or modify-responses. A drop-response means that a service determined that the packet is to be dropped; an allow-response means that a service determined that the packet is to be allowed; and a modify-response means that a service determined that the packet is to be modified. The responses may be encoded using various notations, including a binary notation using three binary values, such as "00," "01," and "10," described above. In some embodiments, the responses may be encoded using an octal notation, a hexadecimal notation, other numerical notations, or alphanumeric strings.

In an embodiment, a modify-response includes instructions for modifying the packet. The instructions may include, for example, the instructions for modifying a header of the packet. The instructions may be encoded in compliance with a communications protocol implemented in both the service machines and the service insertion module. In an embodiment, the protocol used to implement the modification instructions may be the same protocol as the protocol used to encode the types of the responses. Examples of instructions are described in FIG. 3B.

In step 314, the service insertion module analyzes the responses received from the service machines, and, based on the responses, determines whether service processing of the packet is completed.

In an embodiment, completing the service processing of the packet includes determining, merely based on the received responses, that the packet is either to be allowed (and thus forwarded toward its destination) or dropped. If the service insertion module determines that the service processing of the packet is completed, then the service insertion module does not multicast the packet to any other remaining multicast groups of the plurality of multicast groups.

The service insertion module may analyze the responses in many different approaches. Each approach, however, incorporates the built-in intelligence to derive the same decision as if the packet were conventionally processed sequentially by the service chain, but usually does so more efficiently and faster than other approaches. For example, if the service insertion module receives, from the service machines included in the largest multicast group, drop-responses and allow-responses, but no modify-response, then the service insertion module may determine that there is no need to multicast the packet to any other group because the packet needs to be dropped anyway. Therefore, in this situation, the packet servicing is completed after multicasting the packet to only one multicast group, and no sequential multicasting is required.

Since multicasting a packet to a multicast group involves receiving the packet in parallel by all machines in the group, the multicasting of the packet even to a large group is less time consuming than providing the packet sequentially to the service machines in the chain one machine at the time. Furthermore, since the packet is simultaneously multicast to all service machines of the multicast group, and not individually and sequentially to each machine of the multicast group, the presented approach also improves utilization of the resources.

There are also situations in which the presented approach provides improvements over other approaches even if the responses include a modify response. For example, if the largest multicast group includes N members, and the first K members sent allow-responses, while the K+1 member sent a modify-response, then the packet is modified as the $(K+1)^{th}$ member requested. However, the modified packet does not need to be multicast to any of the groups that include any of the K+1 members. Therefore, in this situation, the presented approach is also more efficient than other approaches.

However, if the service insertion module determined that the service processing of the packet is completed, then the service insertion module determines whether the packet should be allowed. If the packet is to be allowed, then the service insertion module notifies hypervisor 112A that the packet should be forwarded toward its destination.

However, if the service insertion module determines that the packet is not to be allowed at this time, then the service insertion module determines whether the packet should be dropped. If the packet should be dropped, then the service insertion module notifies hypervisor 112A that the packet should be dropped.

If the service insertion module determines that the service processing of the packet is completed, but the packet should neither be allowed nor dropped, then the service insertion module may, for example, generate an error message as the responses received from the first multicast group appeared to be unreliable.

3.3. Processing a Modify Response

First, the service insertion module determines whether a first modify-response is preceded in an ordered set of the responses by one or more drop-responses.

Then the service insertion module identifies, in the current multicast group, a service machine that sent the first modify-response. Furthermore, the service insertion module parses the first-modify response to extract one or more instructions for modifying the packet. The instructions may indicate, for example, how to modify a header of the packet.

Then, the service insertion module retrieves the packet from the memory, and uses the instructions extracted from the first modify-response to modify the packet to generate a modified packet. Then, the service insertion module stores the modified packet in the memory. This may include overwriting the packet with the modified packet.

Then, the service insertion module identifies a new multicast group, in the plurality of multicast groups, that is the largest multicast group that does not include the service machine that provided the first modify-response. For example, if service machines SVM 130A, SVM 131A and SVM 132A have been grouped into multicast groups 202, 204 and 206, as depicted in FIG. 2A, and the responses from SVM 130A, SVM 131A and SVM 132A of group 202 were [allow, modify, drop], then the SVM that provided the first modify-response is SVM 131A. Therefore, the new multicast group is group 206 as group 206 is the largest group that does not include SVM 131A. In fact, group 206 includes only SVM 132A.

Once the new multicast group is identified, the service insertion module multicast the modified packet to the new multicast group.

Then, the service insertion module receives a new plurality of responses form the new multicast group, and determines, based on the new plurality of responses received from the new multicast group, whether the service processing of the modified packet is completed. Determining whether the service processing of the modified packet is completed is similar to the determining whether the services processing of the packet is completed, described in step 314 in FIG. 3A.

However, if the service insertion module determines that the service processing of the modified packet is not completed, then the service insertion module copies the new plurality of responses onto the plurality of responses.

However, if the service insertion module determined that the service processing of the modified packet is completed, and determined that the modified packet should be allowed, then the service insertion process notifies hypervisor 112A to forward the modified packet toward its destination.

If the service insertion module determined that the packet should be dropped, then the modified packet is dropped. Otherwise, the service insertion module generates an error message, or re-multicasts the modified packet to the new multicast group.

4. Example Responses

Figure 3B:
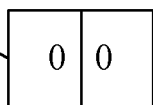
FIG. 3B depicts examples of responses.
Figure 3B:
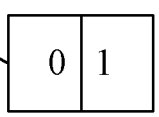
Figure 3B:
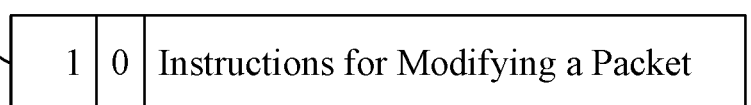

FIG. 3B depicts examples of responses. The depicted examples show the responses encoded using a binary notation. However, the responses may be encoded using other notations, such as an octal notation, a hexadecimal notation, other numerical notations, or alphanumeric strings. The type of notation used to encode the responses, the mapping between encoded values and the responses, and the manner in which the responses can be transmitted and interpreted may be incorporated into a communications protocol that both the service machines and the service insertion module implement.

In FIG. 3B, responses are encoded using a binary notation. Specifically, a drop-response 370 is encoded using a binary value of "00," an allow-response 372 is encoded using a binary value of "01," and a modify-response 374 is encoded using a binary value of "10." Other mappings between the responses and binary values may also be implemented in the communications protocol adopted by the service machines and the service insertion module.

In an embodiment, modify-response 374 includes instructions 376 for modifying a packet. The instructions may indicate, for example, how to modify a header of the packet.

A service machine may send any of responses 370-374 to the service insertion module to indicate the outcome that the service machine determined for the packet.

Upon receiving the responses, the service insertion module may interpret the responses according to the adopted communications protocol and notation.

If a response is modify-response 374, then the service insertion module extracts instructions 376 from response 374 and executes the instructions on the packet to modify the packet and generate a modified packet.

5. Example Implementations 5.1. Flow Chart

Figure 4:
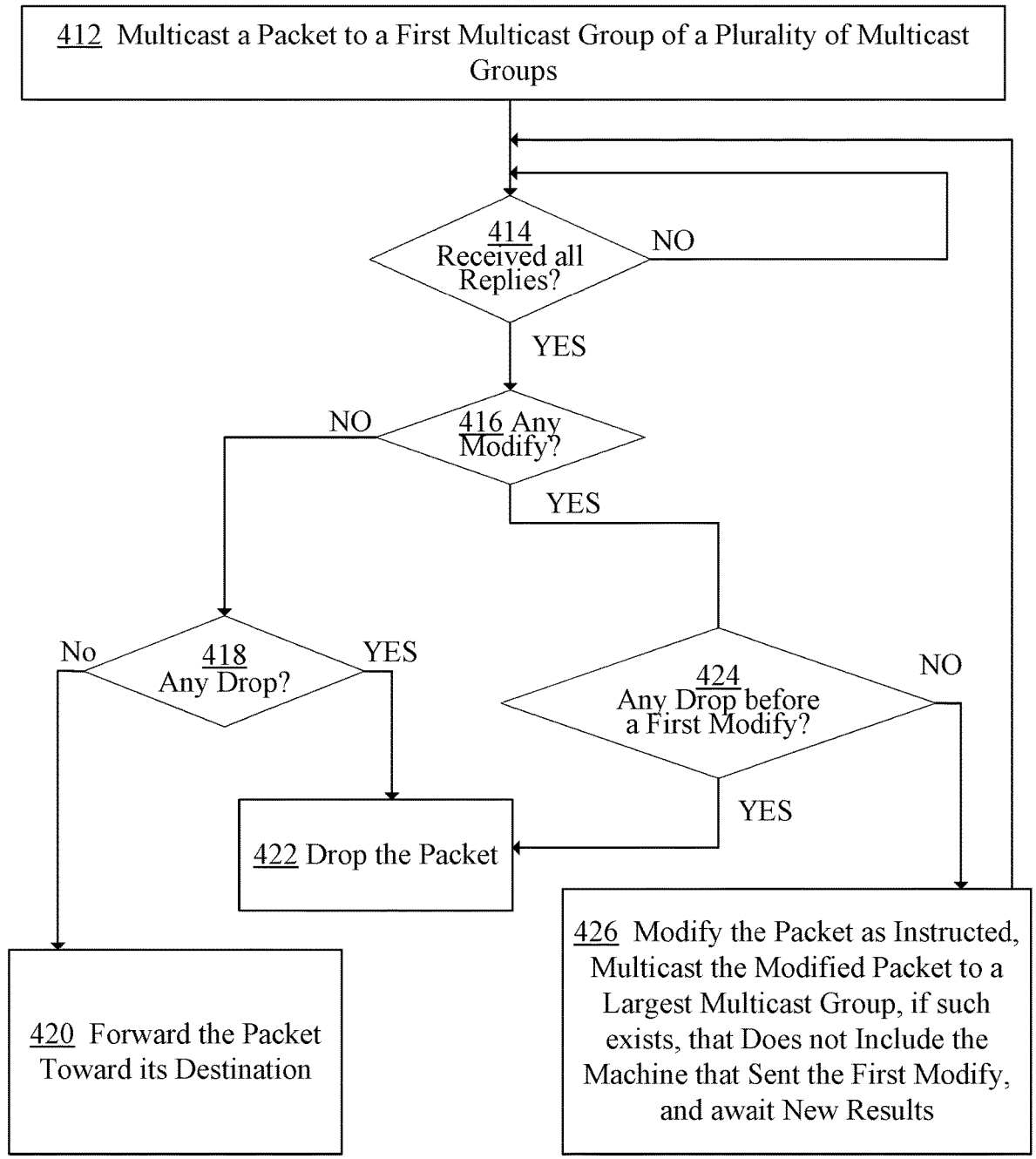
FIG. 4 is an example flow chart for implementing an approach for parallel execution of services, of a serial service chain, on packets using multicast-based service insertion.

FIG. 4 is an example flow chart for implementing an approach for parallel execution of services, of a serial service chain, on packets using multicast-based service insertion. The depicted flow chart is used to describe one or many different approaches for processing responses received from service machines configured to service a packet of a data flow.

It is assumed herein that a plurality of multicast groups has been already created for the data flow, and that the packet of the data flow has been already detected by a service insertion module.

In step 412, the service insertion module multicast a packet to a first multicast group of a plurality multicast groups identified for the data flow to which the packet belongs. The first multicast group is usually the largest multicast group in the plurality of the multicast groups and includes all service machines that are configured to provide the services to the data flow.

In step 414, the service insertion module determines whether all service machines in the multicast group provided their responses generated by applying corresponding services to the packet. Otherwise, the service insertion module awaits the responses.

If the service insertion module determined that all service machines in the multicast group provided their responses, then, in step 416, the service insertion module determines whether any of the responses is a modify-response.

If, in step 416, the service insertion module determined that none of the received responses is a modify-response, then, in step 418, the service insertion module determines whether any of the responses is a drop-response, and if so, then in step 422, the packet is dropped.

However, if in step 416, the service insertion module determined that none of the responses is a modify-response and, in step 418, determined that none of the responses is a drop-response, then, in step 420, the packet is forwarded toward its destination.

If, in step 416, the service insertion module determined that at least one of the responses is a modify-response, then, in step 424, the service insertion module determines whether the responses include any drop-response before a first modify-response. If so, then, in step 422, the packet is dropped.

However, if the responses include at least one modify-response, but the first modify-response is not preceded by any drop-response, then the service insertion module modifies the packet according to the instructions included in the first modify-response, stores a modified packet in memory, determines a new multicast group that is the largest multicast group that does not include a service machine that sent the first modify-response, and multicasts the modified packet to the new multicast group.

Then, the service insertion module awaits new results from the new multicast group and repeats the steps 414-426.

5.2. First Example

Figure 5:
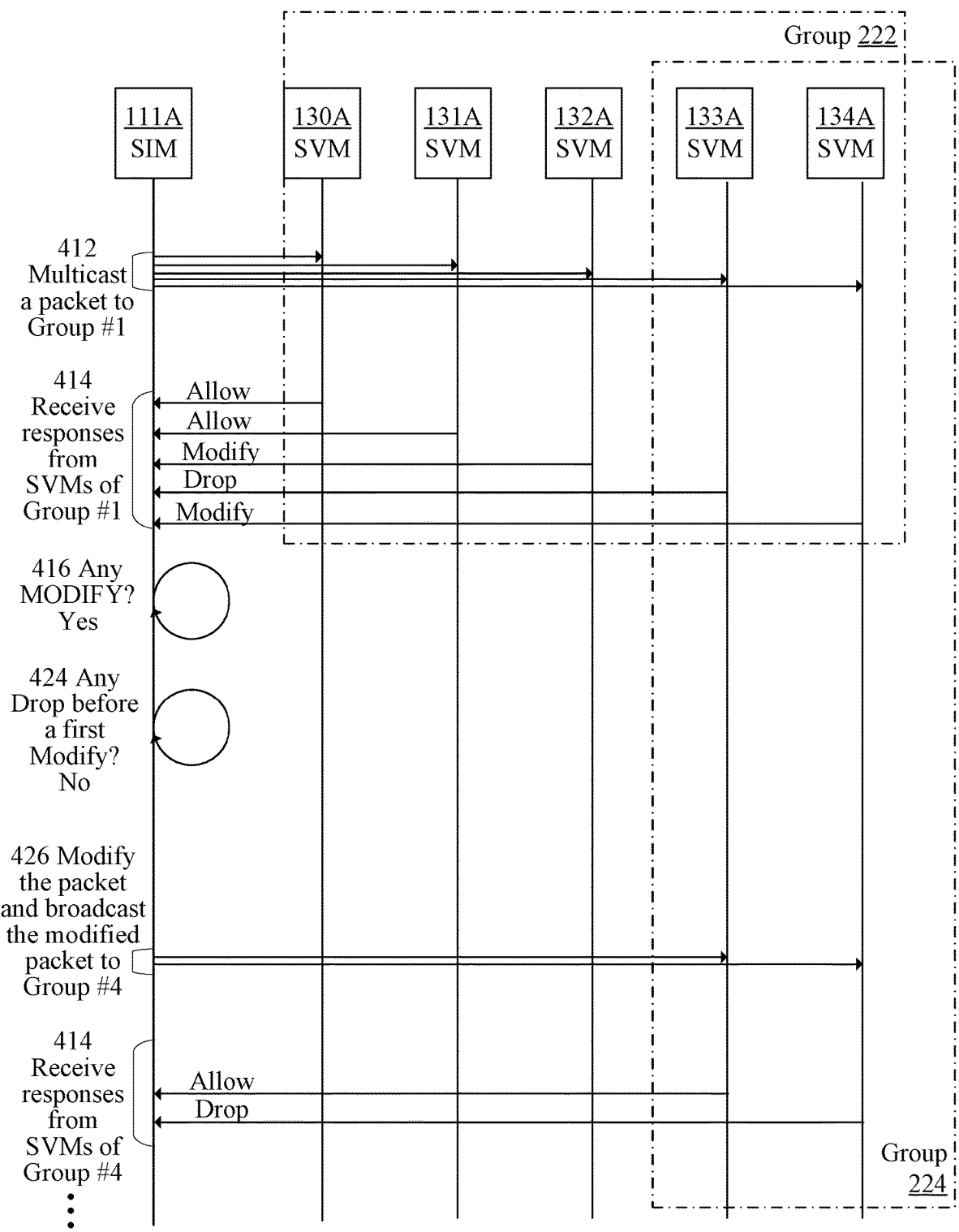
FIG. 5 is an example time chart for implementing an approach for parallel execution of services, of a serial service chain, on packets using multicast-based service insertion.

FIG. 5 is an example time chart for implementing an approach for parallel execution of services, of a serial service chain, on packets using multicast-based service insertion.

The processing is collectively performed by service insertion module 111A, and service virtual machines SVM 130A, SVM 131A, SVM 132A, SVM 133A, and SVM 134A. A first multicast group 222 includes SVMs 130A-134A, while another multicast group 224 includes SVM 133A and SVM 134A.

The steps described in FIG. 5 correspond to selected steps described in FIG. 4.

Upon multicasting (412) a packet to group 222, service insertion module 111A receives (414) responses from SVMs 130A-134A. Suppose that the responses include [allow, allow, modify, drop, modify].

Following the process described in FIG. 4, service insertion module 111A tests (416) whether any of the responses is a modify-response, and since it is, service insertion module 111A tests (424) whether the responses include any drop-response before the first modify-response. Since the first modify-response in the responses [allow, allow, modify, drop, modify] was received from SVM 132A, and is not preceded by any drop-response, service insertion module 111A generates a modified packet by modifying the packet according to the instructions included in the first modify-response, stores the modified packet in memory, and multicasts the modified packet to group 224, which is the largest multicast group that does not include SVM 132A. Then, service insertion module 111A awaits (414) responses from group 224.

In this example, the presented parallel execution of services of a serial service chain provides significant savings in terms of the processing time and resources. In this example, the packet was multicast to the five-member group 222, and the modified packet was multicast to the two-member group 224, but not to any other groups (not shown). Hence, the processing was faster and more efficient than the processing using sequential processing of the service chain—one service at the time.

5.3. Second Example

Figure 6:
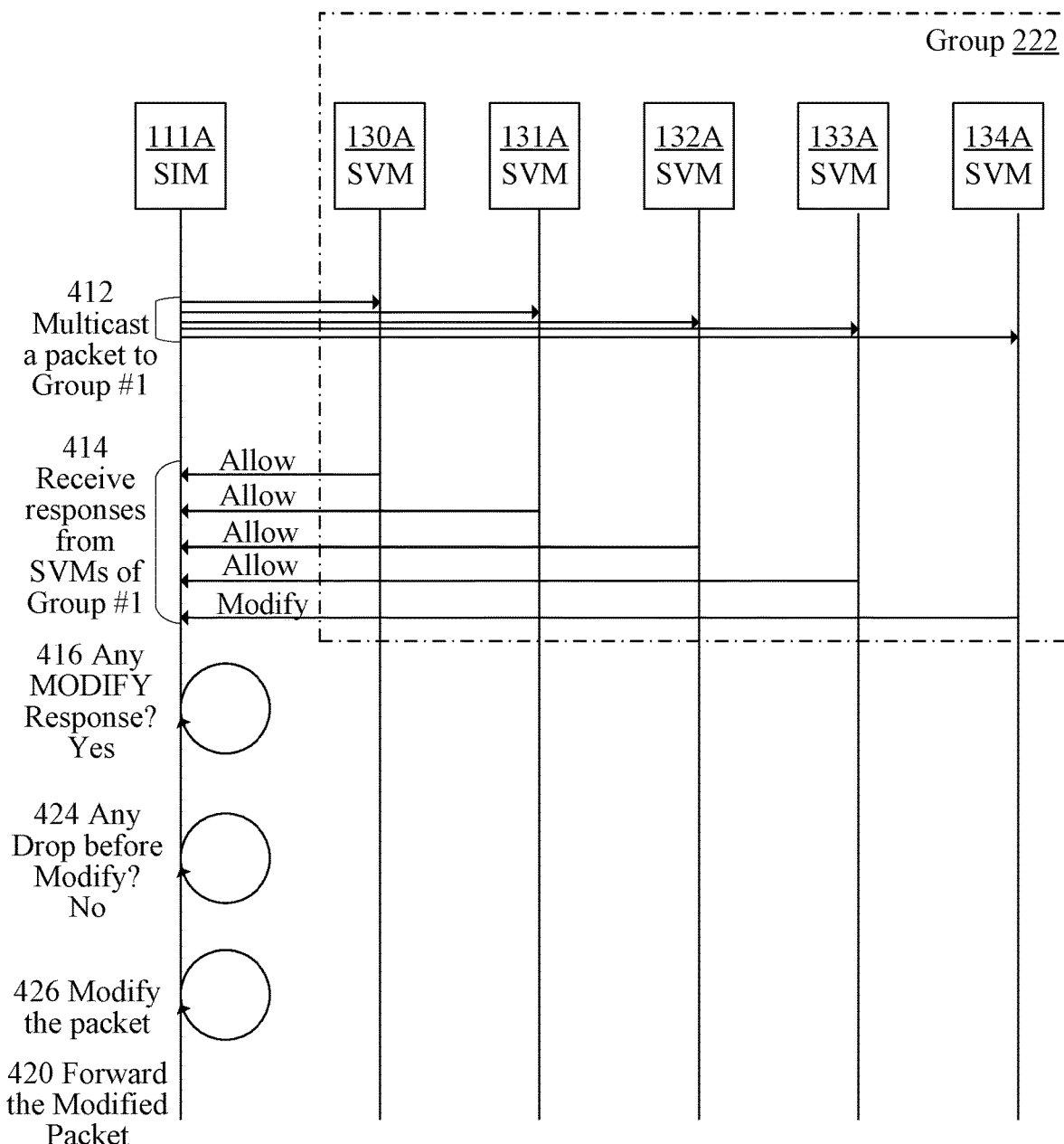
FIG. 6 is an example time chart for implementing an approach for parallel execution of services, of a serial service chain, on packets using multicast-based service insertion.

FIG. 6 is an example time chart for implementing an approach for parallel execution of services, of a serial service chain, on packets using multicast-based service insertion.

The processing is collectively performed by service insertion module 111A, and service virtual machines SVMs 130A-134A, as in FIG. 5; however, the service processing of the packet requires here sending the packet only to a first multicast group 222 that includes SVMs 130A-134A, and not to any other multicast group.

Upon multicasting (412) the packet to group 222, service insertion module 111A receives (414) responses from SVMs 130A-134A. Suppose that the responses include [allow, allow, allow, allow, modify].

Following the process described in FIG. 4, service insertion module 111A tests (416) whether any of the responses is a modify-response. If it is, then service insertion module 111A tests (424) whether there is any drop-response before the first modify-response. Since the first modify-response in the responses [allow, allow, allow, allow, modify] was received from SVM 134A, and is not preceded by any drop-response, service insertion module 111A generates a modified packet by modifying (426) the packet according to the instructions included in the first modify-response, and the modified packet is forwarded toward its destination.

The presented parallel execution of services, of a serial service chain, on the particular packet provides significant savings in terms of the processing time and resources. In the example, the largest multicast group includes five members, and the members applied their respective services to the packet in parallel. Furthermore, since after receiving the responses from the members, no additional multicasting was performed, the presented approach provides improvements over other approaches in terms of efficiency and resources preservation.

5.4. Third Example

Figure 7:
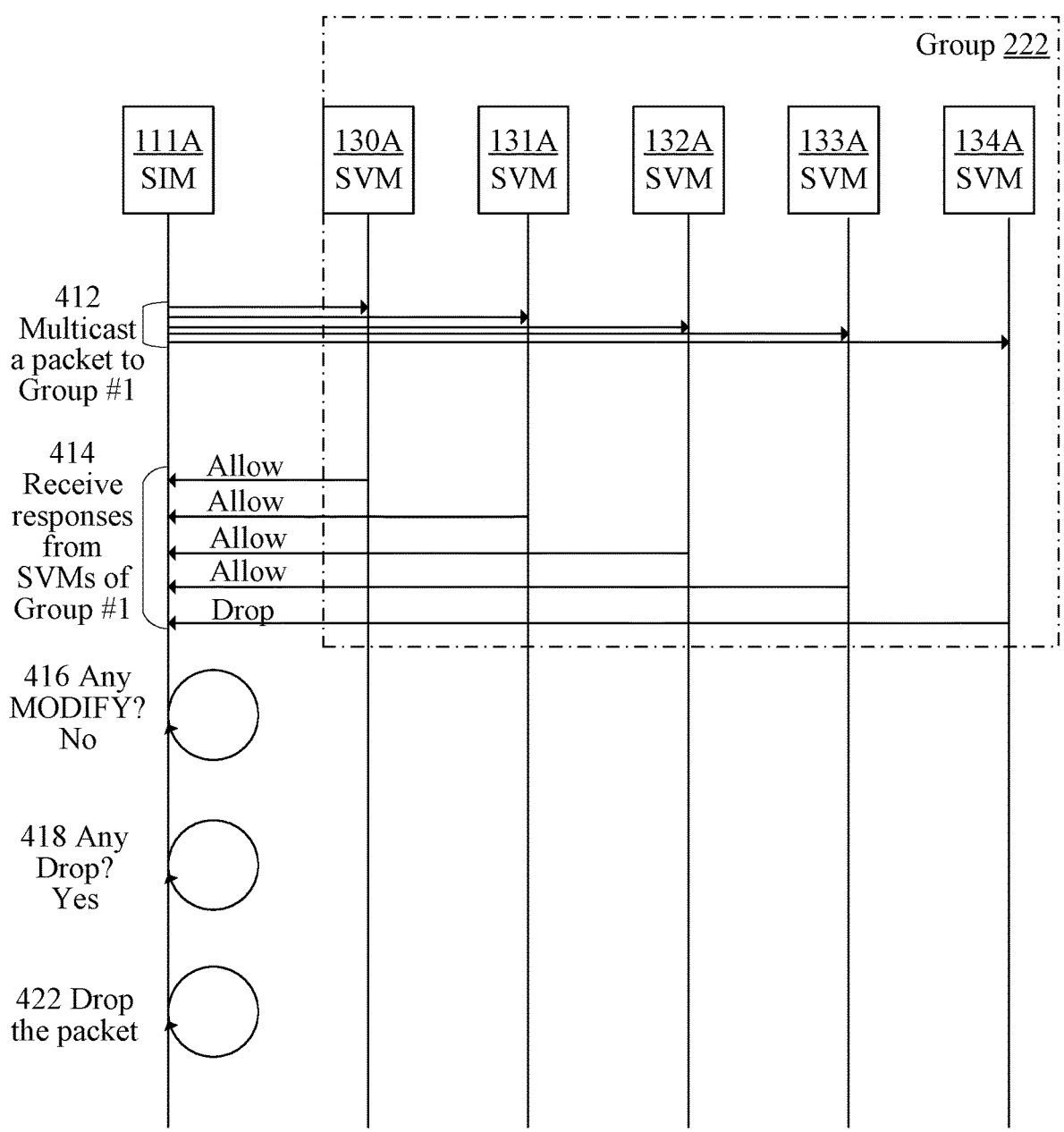
FIG. 7 is an example time chart for implementing an approach for parallel execution of services, of a serial service chain, on packets using multicast-based service insertion.

FIG. 7 is an example time chart for implementing an approach for parallel execution of services, of a serial service chain, on packets using multicast-based service insertion.

The processing is collectively performed by service insertion module 111A, and service virtual machines SVMs 130A-134A, as in FIG. 5; however, the service processing of the packet requires here sending the packet only to a first multicast group 222 that includes SVMs 130A-134A, and not to any other multicast group.

Upon multicasting (412) a packet to group 222, service insertion module 111A receives (414) responses from SVMs 130A-134A. Suppose that the responses include [allow, allow, allow, allow, drop].

Following the process described in FIG. 4, service insertion module 111A tests (416) whether any of the responses is a modify-response. Since the responses do not include a modify-response, service insertion module 111A tests (418) if the responses include any drop-response. Since the responses [allow, allow, allow, allow, drop] include a drop-response, the packet is dropped (422).

In this example, the presented parallel execution of services, of a serial service chain, on the packet provides significant savings in terms of the processing time and resources because the packet was dropped (disposed) after multicasting the packet only to one multicast group. In contrast, other service-chaining approaches would require sending the packet to each of the service machines individually and sequentially, and that would be time consuming and inefficient.

6. Implementation Mechanisms

The present approach may be implemented using a computing system comprising one or more processors and memory. The one or more processors and memory may be provided by one or more hardware machines. A hardware machine includes a communications bus or other communication mechanisms for addressing main memory and for transferring data between and among the various components of hardware machine. The hardware machine also includes one or more processors coupled with the bus for processing information. The processor may be a microprocessor, a system on a chip (SoC), or other type of hardware processor.

Main memory may be a random-access memory (RAM) or other dynamic storage device. It may be coupled to a communications bus and used for storing information and software instructions to be executed by a processor. Main memory may also be used for storing temporary variables or other intermediate information during execution of software instructions to be executed by one or more processors.

7. General Considerations

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to affect such feature, structure, or characteristic in connection with other embodiments whether or not explicitly indicated.

Various features of the disclosure have been described using process steps. The functionality/processing of a given process step could potentially be performed in diverse ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

What is claimed is:

1. A method comprising:
    identifying a plurality of services to be applied to packets of a data flow;
    determining a plurality of service machines that are configured to provide the plurality of services for the data flow;
    grouping the plurality of service machines to a plurality of multicast groups; wherein multicast groups in the plurality of multicast groups are sequentially ordered from a first multicast group that includes a largest count of service machines to a last multicast group that includes a smallest count of service machines;
    detecting a packet of the data flow and storing the packet in memory;
    multicasting the packet to the first multicast group of the plurality of multicast groups to cause applying, in parallel, services of service machines included in the first multicast group to the packet;
    upon receiving a plurality of responses from service machines that belong to the first multicast group:
        determining, based on the plurality of responses, whether service processing of the packet is completed; and
        in response to determining that service processing of the packet is completed, dispose the packet according the plurality of responses and without multicasting the packet to any other multicast group of the plurality of multicast groups.

2. The method of claim 1, further comprising:
parsing the plurality of responses to identify a plurality of codes, wherein a code of the plurality of codes includes any of: a drop code, an allow code, or a modify code;
wherein determining, based on the plurality of responses, whether service processing of the packet is completed comprises:
forwarding the packet to its destination responsive to determining that all codes in the plurality of codes include the allow code; and
dropping the packet responsive to determining that none of codes in the plurality of codes includes the modify code, and at least one of codes in the plurality of codes includes the drop code.

3. The method of claim 2, wherein a code of the plurality of codes is a binary number; and wherein each of the codes in the plurality of codes has assigned a unique binary number.

4. The method of claim 2, further comprising:
in response to determining, upon receiving the plurality of responses from service machines that belong to the first multicast group, that service processing of the packet is not completed:
determining whether the plurality of codes includes one or more modify codes;
in response to determining that the plurality of codes includes one or more modify codes:
identifying a service machine, in the first multicast group, that sent a response that comprises a first modify code;
parsing the response to extract one or more instructions for modifying the packet;
modifying the packet according to the one or more instructions to generate a modified packet;
identifying a new multicast group, in the plurality of multicast groups, that is a largest multicast group that does not include the service machine; and
multicasting the modified packet to the new multicast group.

5. The method of claim 4, wherein the plurality of multicast groups is identified by a service insertion module of a hypervisor; wherein the packet is stored in the memory of the hypervisor; and wherein modifying the packet according to the one or more instructions is performed by the hypervisor.

6. The method of claim 5, wherein data about the data flow and data about the plurality of multicast groups is stored in a service insertion table of the hypervisor.

7. The method of claim 1, wherein the plurality of service machines includes any of:
a guest service machine or a service appliance.

8. One or more non-transitory computer-readable storage media storing one or more computer instructions which, when executed by one or more processors, cause the one or more processors to perform:
identifying a plurality of services to be applied to packets of a data flow;
determining a plurality of service machines that are configured to provide the plurality of services for the data flow;
grouping the plurality of service machines to a plurality of multicast groups; wherein multicast groups in the plurality of multicast groups are sequentially ordered from a first multicast group that includes a largest count of service machines to a last multicast group that includes a smallest count of service machines;
detecting a packet of the data flow and storing the packet in memory;
multicasting the packet to the first multicast group of the plurality of multicast groups to cause applying, in parallel, services of service machines included in the first multicast group to the packet;
upon receiving a plurality of responses from service machines that belong to the first multicast group:
determining, based on the plurality of responses, whether service processing of the packet is completed; and
in response to determining that service processing of the packet is completed, dispose the packet according the plurality of responses and without multicasting the packet to any other multicast group of the plurality of multicast groups.

9. The one or more non-transitory computer-readable storage media of claim 8, storing additional instructions which, when executed by the one or more processors, cause the one or more processors to perform:
parsing the plurality of responses to identify a plurality of codes, wherein a code of the plurality of codes includes any of: a drop code, an allow code, or a modify code;
wherein determining, based on the plurality of responses, whether service processing of the packet is completed comprises:
forwarding the packet to its destination responsive to determining that all codes in the plurality of codes include the allow code; and
dropping the packet responsive to determining that none of codes in the plurality of codes includes the modify code, and at least one of codes in the plurality of codes includes the drop code.

10. The one or more non-transitory computer-readable storage media of claim 9, wherein a code of the plurality of codes is a binary number; and wherein each of the codes in the plurality of codes has assigned a unique binary number.

11. The one or more non-transitory computer-readable storage media of claim 9, storing additional instructions which, when executed by the one or more processors, cause the one or more processors to perform:
in response to determining, upon receiving the plurality of responses from service machines that belong to the first multicast group, that service processing of the packet is not completed:
determining whether the plurality of codes includes one or more modify codes;
in response to determining that the plurality of codes includes one or more modify codes:
identifying a service machine, in the first multicast group, that sent a response that comprises a first modify code;
parsing the response to extract one or more instructions for modifying the packet;
modifying the packet according to the one or more instructions to generate a modified packet;
identifying a new multicast group, in the plurality of multicast groups, that is a largest multicast group that does not include the service machine; and
multicasting the modified packet to the new multicast group.

12. The one or more non-transitory computer-readable storage media of claim 11, wherein the plurality of multicast groups is identified by a service insertion module of a hypervisor; wherein the packet is stored in the memory of the hypervisor; and wherein modifying the packet according to the one or more instructions is performed by the hypervisor.

13. The one or more non-transitory computer-readable storage media of claim 12, wherein data about the data flow and data about the plurality of multicast groups is stored in a service insertion table of the hypervisor.

14. The one or more non-transitory computer-readable storage media of claim 8, wherein the plurality of service machines includes any of: a guest service machine or a service appliance.

15. A hypervisor implemented in a host computer, the hypervisor comprising:
one or more processors;
one or more memory units; and
one or more non-transitory computer-readable storage media storing one or more computer instructions which, when executed by the one or more processors, cause the one or more processors to perform:
identifying a plurality of services to be applied to packets of a data flow;
determining a plurality of service machines that are configured to provide the plurality of services for the data flow;
grouping the plurality of service machines to a plurality of multicast groups; wherein multicast groups in the plurality of multicast groups are sequentially ordered from a first multicast group that includes a largest count of service machines to a last multicast group that includes a smallest count of service machines;
detecting a packet of the data flow and storing the packet in memory;
multicasting the packet to the first multicast group of the plurality of multicast groups to cause applying, in parallel, services of service machines included in the first multicast group to the packet;
upon receiving a plurality of responses from service machines that belong to the first multicast group:
determining, based on the plurality of responses, whether service processing of the packet is completed; and
in response to determining that service processing of the packet is completed, dispose the packet according the plurality of responses and without multicasting the packet to any other multicast group of the plurality of multicast groups.

16. The hypervisor of claim 15, storing additional instructions which, when executed by the one or more processes, cause the one or more processors to perform:
parsing the plurality of responses to identify a plurality of codes, wherein a code of the plurality of codes includes any of: a drop code, an allow code, or a modify code;
wherein determining, based on the plurality of responses, whether service processing of the packet is completed comprises:
forwarding the packet to its destination responsive to determining that all codes in the plurality of codes include the allow code; and
dropping the packet responsive to determining that none of codes in the plurality of codes includes the modify code, and at least one of codes in the plurality of codes includes the drop code.

17. The hypervisor of claim 16, wherein a code of the plurality of codes is a binary number; and wherein each of the codes in the plurality of codes has assigned a unique binary number.

18. The hypervisor of claim 16, storing additional instructions which, when executed by the one or more processes, cause the one or more processors to perform:
in response to determining, upon receiving the plurality of responses from service machines that belong to the first multicast group, that service processing of the packet is not completed:
determining whether the plurality of codes includes one or more modify codes;
in response to determining that the plurality of codes includes one or more modify codes:
identifying a service machine, in the first multicast group, that sent a response that comprises a first modify code;
parsing the response to extract one or more instructions for modifying the packet;
modifying the packet according to the one or more instructions to generate a modified packet;
identifying a new multicast group, in the plurality of multicast groups, that is a largest multicast group that does not include the service machine; and
multicasting the modified packet to the new multicast group.

19. The hypervisor of claim 18, wherein the plurality of multicast groups is identified by a service insertion module of the hypervisor; wherein the packet is stored in the memory of the hypervisor; and wherein modifying the packet according to the one or more instructions is performed by the hypervisor.

20. The hypervisor of claim 19, wherein data about the data flow and data about the plurality of multicast groups is stored in a service insertion table of the hypervisor.

\* \* \* \* \*